United States Patent
Winter

(10) Patent No.: US 6,408,561 B1
(45) Date of Patent: Jun. 25, 2002

(54) FISHING ALARM AND LIGHTING APPARATUS

(75) Inventor: Dwaine L. Winter, Staples, MN (US)

(73) Assignee: Carole A. Winter, Staples, MN (US)

( * ) Notice: Subject to any disclaimer, the term of this patent is extended or adjusted under 35 U.S.C. 154(b) by 9 days.

(21) Appl. No.: 09/656,929

(22) Filed: Sep. 7, 2000

(51) Int. Cl.$^7$ ............................................. A01K 97/12
(52) U.S. Cl. ................................................. 43/17.5
(58) Field of Search ............................... 43/15, 16, 17, 43/17.1, 17.5

(56) References Cited

U.S. PATENT DOCUMENTS

| | | | |
|---|---|---|---|
| 3,913,255 A | * 10/1975 | Filmen | 43/17 |
| 4,183,076 A | 1/1980 | Bodde | 362/120 |
| 4,214,394 A | 7/1980 | Shogan | 43/17 |
| 4,398,185 A | 8/1983 | Robert, Sr. | 340/573 |
| 4,506,257 A | 3/1985 | Roberts, Sr. | 340/521 |
| 4,520,586 A | 6/1985 | Moisan | 43/17 |
| 4,586,284 A | 5/1986 | Westwood, III | 43/17 |
| 4,590,701 A | 5/1986 | Rivers | 43/17 |
| 4,727,673 A | 3/1988 | Dumar | 43/17 |
| 4,794,719 A | 1/1989 | Rabino | 43/17 |
| 4,809,456 A | 3/1989 | Caparelli, Jr. et al. | 43/17 |
| 4,996,788 A | 3/1991 | Wieting et al. | 43/17 |
| 5,063,373 A | * 11/1991 | Lindsley | 340/573 |
| 5,261,180 A | 11/1993 | Foster et al. | 43/17 |
| 5,396,726 A | * 3/1995 | Zepeda, Sr. | 43/17 |
| 5,738,433 A | 4/1998 | Sparks | 362/109 |
| 5,797,211 A | 8/1998 | Bae et al. | 43/17 |
| 5,862,621 A | 1/1999 | Karppanen | 43/17 |
| 5,867,931 A | 2/1999 | Morris et al. | 43/17 |
| 5,867,933 A | * 2/1999 | Walker | 43/43.13 |
| 5,884,429 A | 3/1999 | Cube | 43/17 |
| 5,894,691 A | 4/1999 | Zepeda, Sr. | 43/17 |
| 5,970,645 A | 10/1999 | Thill | 43/17 |
| 5,979,101 A | 11/1999 | Muenchow | 43/17 |
| 5,986,552 A | 11/1999 | Lyons | 340/573.2 |
| 5,996,268 A | 12/1999 | Buczkowski et al. | 43/17 |
| 6,035,573 A | 3/2000 | Flores | 43/17 |
| 6,119,389 A | * 9/2000 | Walker | 43/43.13 |

* cited by examiner

Primary Examiner—Charles T. Jordan
Assistant Examiner—Kimberly S. Smith
(74) Attorney, Agent, or Firm—Kinney & Lange P.A.

(57) ABSTRACT

A fishing alarm and lighting apparatus with a portable housing containing an electrical circuit and power source is disclosed. The apparatus detects a fish strike and triggers an alarm which alerts a fisherman by either illuminating a signal light, emitting an audible signal, or both. The apparatus also includes a utility light mounted to the housing which is a separate from and capable of simultaneous use with the alarm signal light.

7 Claims, 5 Drawing Sheets

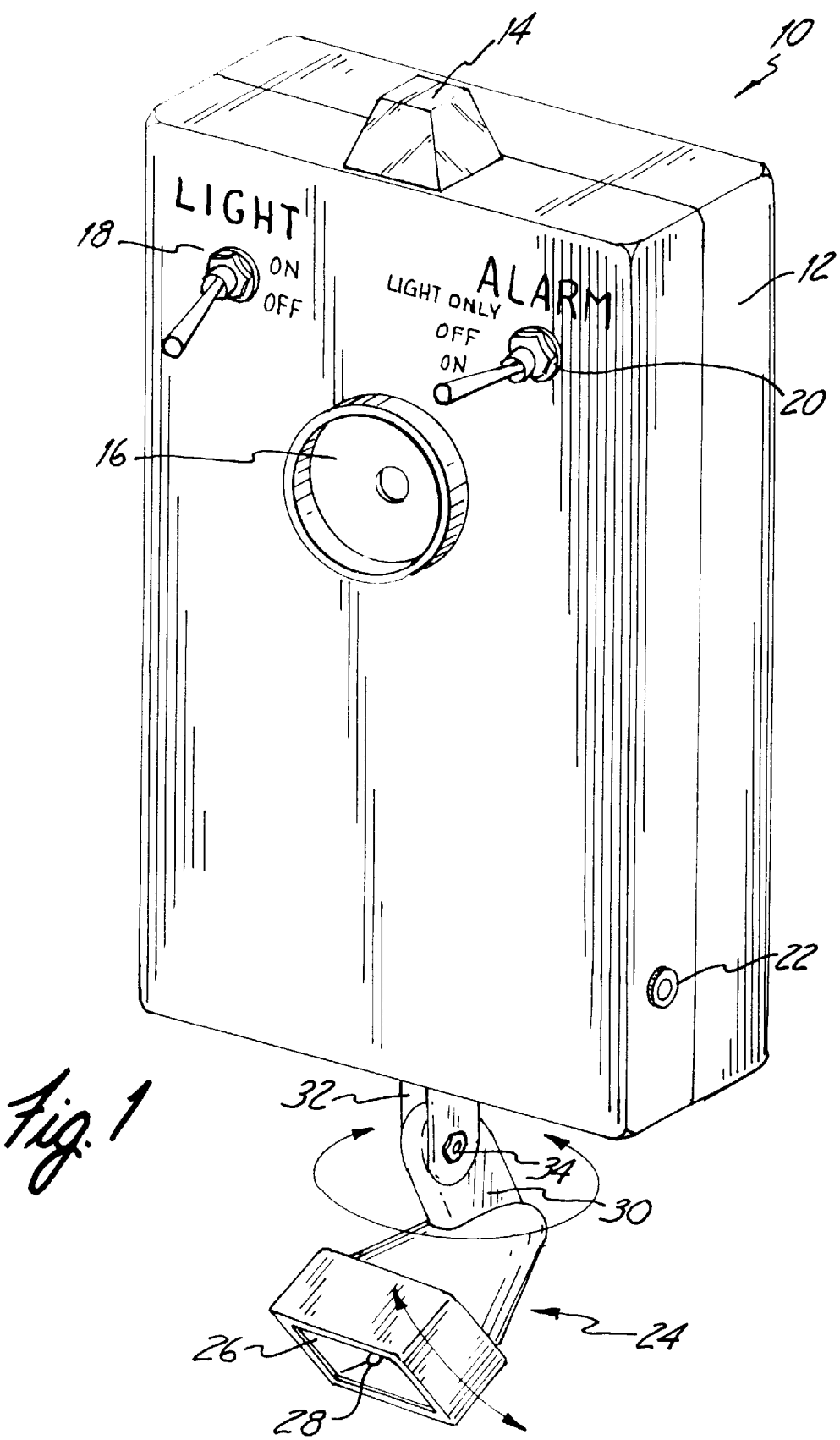

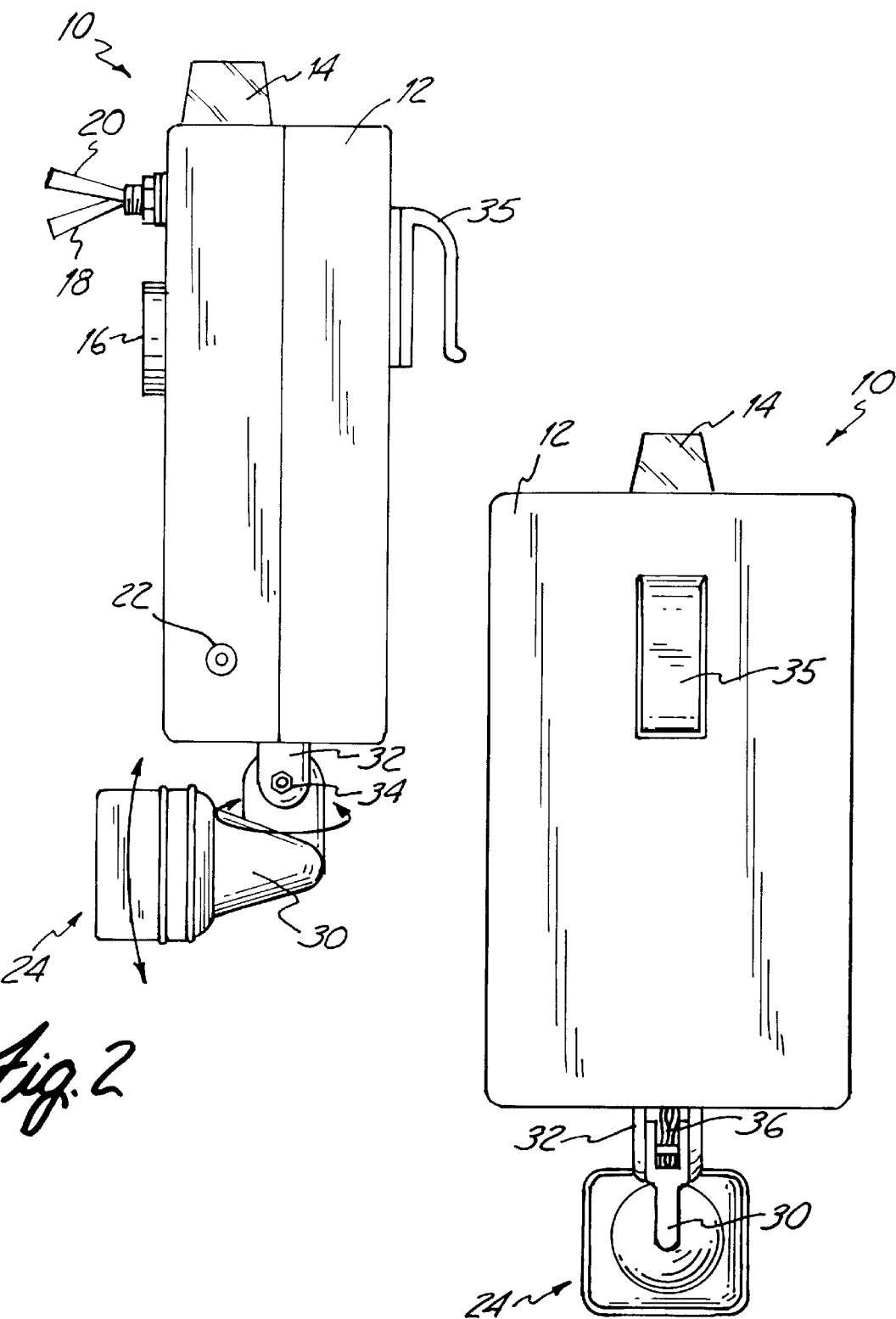

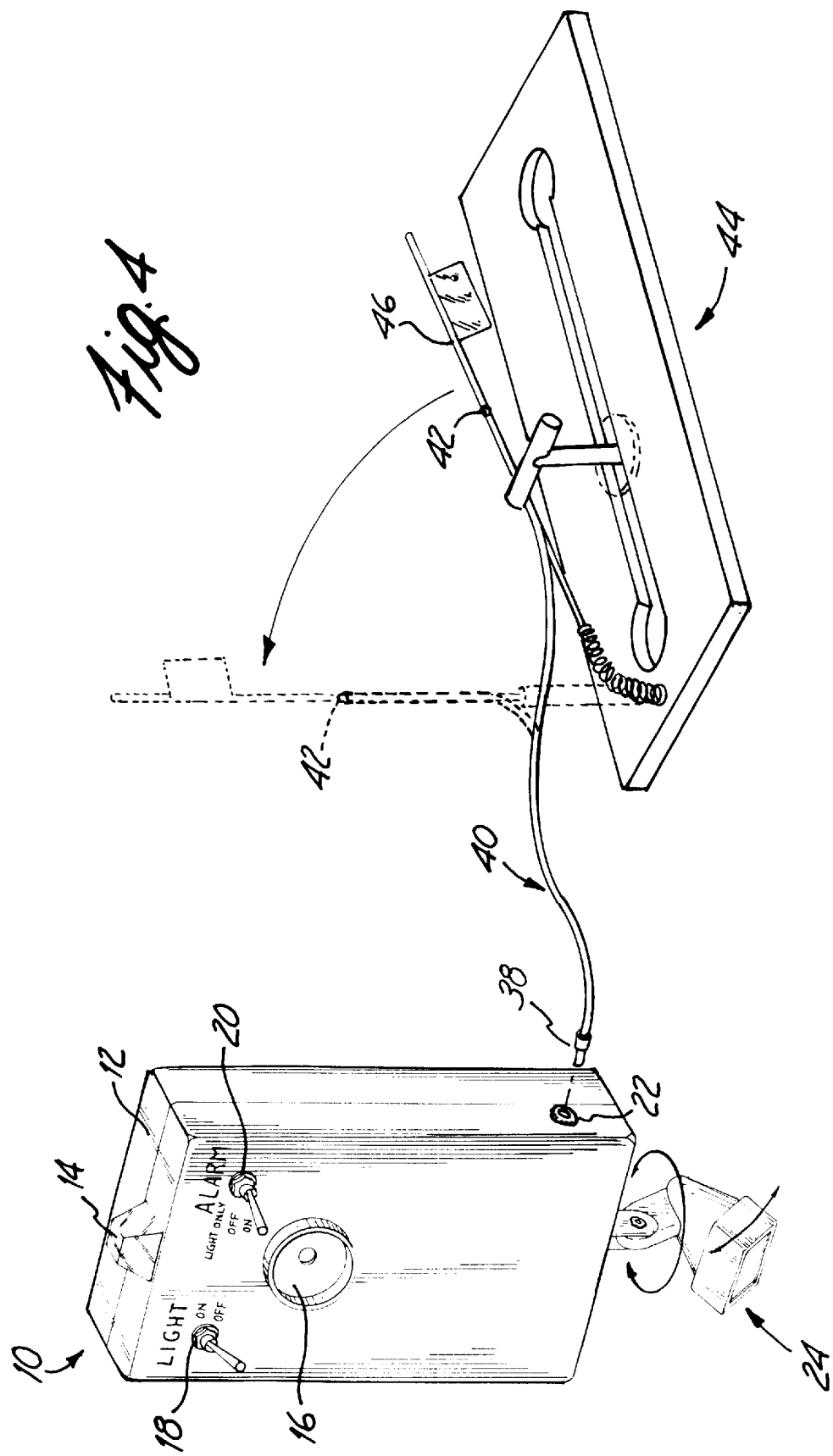

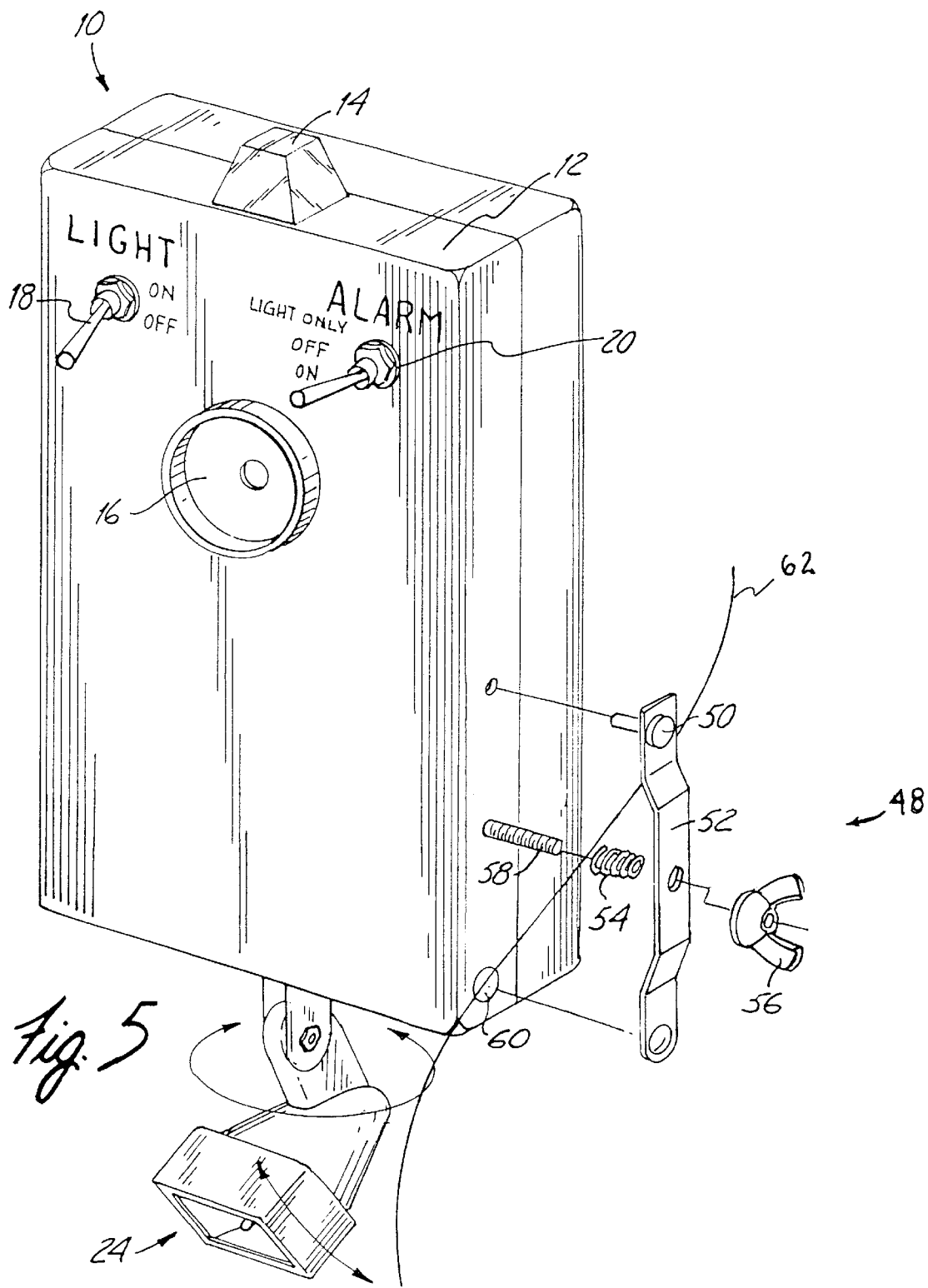

FISHING ALARM AND LIGHTING APPARATUS

BACKGROUND OF THE INVENTION

The present invention relates generally to fishing apparatus. Specifically, the present invention relates to a combination of an alarm that alerts fisherman when a fish strikes the hook and a utility light.

There are numerous electrical alarming devices for use with fishing apparatus known in the art. Such devices utilize batteries as a power source making them capable of use anywhere. Some of these devices are mounted directly on a fishing apparatus, such as a rod or pole, while others are mounted separate from the apparatus.

Various methods exist for detecting when a fish has struck the hook. A common detection method shown in U.S. Pat. Nos. 4,794,719 and 4,214,394 involves placing the fishing line between two electrical contacts which completes an alarming circuit when the line is removed by a striking fish. Other devices attach the fishing line to a mechanical arm which moves into a triggering position when the line is tugged as described in U.S. Pat. No. 4,398,185. Another detection method employed in U.S. Pat Nos. 5,797,211 and 4,590,701 senses the motion of the fishing pole triggering the alarm when the pole is bowed by a striking fish. In other devices, such as those disclosed in U.S. Pat Nos. 5,894,691 and 5,867,931, the alarm is triggered by sensing the tension of the fishing line.

These detection methods can be employed when fishing with a pole or adapted for use with an ice fishing tip-up by utilizing the movement of the tip-up arm when a fish strikes. Rather than detecting the movement of the fishing line directly, line can be coupled to the tip-up arm to achieve the same results. Similarly, devices that sense the motion of the fishing pole can be adapted to sense the motion of the tip-up arm.

Various alarming devices have been designed for use exclusively with ice fishing tip-ups. A common detection method used with ice fishing tip-ups shown in U.S. Pat. No. 4,996,788 involves illuminating light source when electrically conductive materials both on the device and the tip-up arm come in contact. Another method disclosed in U.S. Pat. No. 5,979,101 involves mounting the alarming device onto the tip-up arm and sensing when the tip-up arm moves into a vertical position.

When these detection mechanisms are triggered, the alarming devices alert the user by a visual signal, an audible signal, or both. the visual signals used in alarming devices consist of LEDs, small light sources, or even large flashlights. When alarming capabilities of these devices are not being used, the prior art devices provide an alternative use for the signaling light such as using it as a flashlight. One drawback is that the alarming function of the device is disabled when the signal light is used in this manner.

BRIEF SUMMARY OF THE INVENTION

The present invention is a fishing alarm and lighting apparatus. The device is battery operated and portable for use anywhere. It can be used for both pole fishing and ice fishing with tip-ups. The device has multiple methods of detecting a fish strike, one of which involves placing the fishing line between two electrical contacts which complete an electrical circuit when the line is removed thereby triggering the alarm. Another method, which is used when ice fishing with a tip-up, involves attaching a self-contained sensor to the tip-up arm which completes the electrical circuit when the tip-up is moved into a vertical position by a fish strike. The fish alarm is activated by a switch and can be set to alert the fisherman when a fish has taken the hook by both a signal light and an audible signal, or by the signal light only. The present invention also has a rotatable and pivotable utility light fixed to the housing separate from and capable of simultaneous use with the alarm signal light.

BRIEF DESCRIPTION OF THE DRAWINGS

FIG. 1 is a perspective view of the fishing alarm and lighting apparatus.

FIG. 2 is a side view of the fishing alarm and lighting apparatus.

FIG. 3 is a rear view of the fishing alarm and lighting apparatus.

FIG. 4 is a perspective view of the fishing alarm and lighting apparatus when used with a typical fishing tip-up device.

FIG. 5 is a perspective view of the fishing alarm and lighting apparatus when used with a fishing line.

DETAILED DESCRIPTION

Figure 6:
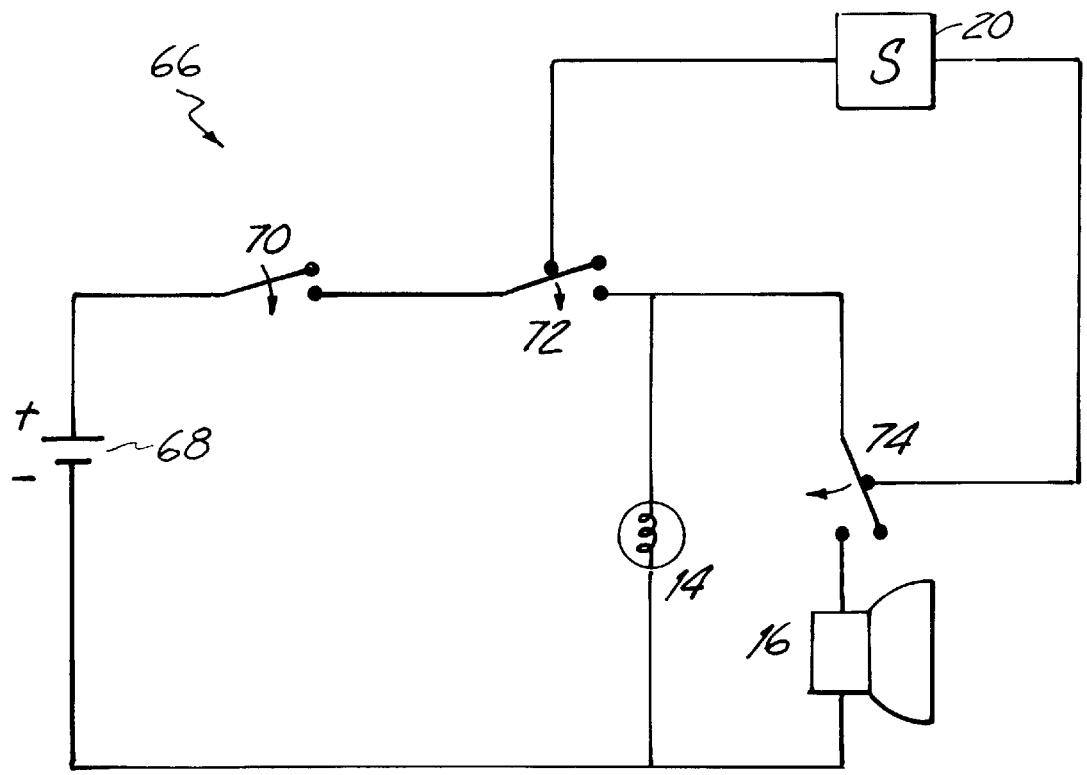
FIG. 6 is an electrical schematic of the alarm circuit.

FIG.1 is a perspective view of fishing alarm and lighting apparatus 10 in accordance with the present invention. Fishing alarm and lighting apparatus 10 is a combination of a fishing alarm and a utility light.

Fishing alarm and lighting apparatus 10 includes housing 12, indicator light 14, alarm speaker 16, two-way switch 18, and thee-way switch 20. Jack 22 is set into the side of housing 12. Utility light 24 is mounted to the bottom of housing 12 and consists of lens 26, bulb 28, arm 30, swivel 32, and hinge 34.

Various detection methods can be used in conjunction with fishing alarm and lighting apparatus 10. In an exemplary embodiment, further described in FIG. 4, a self-contained sensor is attached to the arm of an ice-fishing tip-up and connected to the apparatus through jack 22. When the arm is moved into a vertical position by a striking fish, an alarming circuit, further described in FIG. 6, is completed triggering the alarming capabilities of fishing alarm and lighting apparatus 10. In another exemplary embodiment, further described in FIG. 5, fishing line is placed between two electrical contacts. When a fish strikes, the line is pulled from the electrical contacts allowing the contacts to touch thereby completing the alarming circuit.

Fishing alarm and lighting apparatus 10 has two means of alarming fisherman when a fish strikes the hook, which consist of illuminating indicator light 14 and emitting an audible signal through speaker 16. Three-way switch 20 controls the alarming function of fishing alarm and lighting apparatus 10. The first position of three-way switch 20 enables only indicator light 14 to signal the detection of a fish strike. The second position of three-way switch 20 disables the alarming capability of fishing alarm and lighting apparatus 10. The third position of three-way switch 20 enables both indicator light 14 and speaker 16 to signal the detection of a fish strike.

Utility light 24 is mounted to the bottom of housing 12 of fishing alarm and lighting apparatus 10. Utility light 24 pivots and rotates thereby aiding a fisherman when baiting hooks, landing fish, and performing various other tasks.

Two-way switch 18 controls the operation of utility light 24. Switch 18 has two positions, the first of which enables utility light 24 and the second disables utility light 24.

In addition to its use as a fishing alarm, fishing alarm and lighting apparatus 10 can be used in other applications where and alarm is required. Some of these alternatives include an alarm for fishing docks or an alarm for a camping perimeter.

FIG. 2 is a side view of fishing alarm and lighting apparatus 10. As previously described indicator light 14 is mounted at the top of housing 12. Alarm speaker 16 is fixed to the front of housing 12. Also fixed to housing 12 are two-way switch 18 and three-way switch 20. Jack 22 is set into the side of housing 12. Attached to the back of housing 12 is clip 35.

FIG. 2 further illustrates the functional capability of utility light 24. Swivel 32 extends from housing 12 and is connected to arm 30 at hinge 34. Swivel 32 rotates 360 degrees allowing utility light 24 to be aimed in all directions parallel to the plane extending from the bottom side of housing 12. Arm 30 rotates slightly more than 90 degrees about hinge 34 allowing utility light 24 to be aimed at an object directly below fishing alarm and lighting apparatus 10 or at an object slightly above the plane extending from the bottom side of housing 12.

FIG. 3 is a rear view of fishing alarm and lighting apparatus 10. Indicator light 14 is shown mounted on housing 12. In one preferred embodiment clip 35 is attached to the rear of housing 12 and is used for mounting the device. Clip 35 is designed for mounting on the rim of a five-gallon bucket or a bucket of similar construction. Clip 35 can also be used to mount fishing alarm and lighting apparatus 10 to various other objects. One skilled in the art would recognize that other fastening mechanisms can be used as an alternative to clip 35 to mount fishing alarm and lighting apparatus 10.

FIG. 3 also shows utility light 24 extending from the bottom of housing 12. Swivel 32 is shown and connects to arm 30. Wiring 36 extends from inside housing 12 through the arm connecting bulb 28 to a power source. Swivel 32 is equipped with a stop allowing it to rotate a maximum of 360 degrees which prevents wiring 36 from breaking.

FIG. 4 is a perspective view of fishing alarm and lighting apparatus 10 when used with a typical ice fishing tip-up 44. Electrical lead 40 is coupled to connector 38 at one end and sensor 42 at the other end. Sensor 42 is then attached to tip-up arm 46 and connector 38 is inserted into jack 22. In an alternative embodiment, electrical lead 40 is attached permanently to housing 12. When a fish strikes the hook, tip-up arm 46 will move from horizontal position into a vertical position. Sensor 42 contains a metal ball which comes into contact with wires inside electrical lead 40 when in a vertical position. This completes the alarming circuit of fishing alarm and lighting apparatus 10, further described in FIG. 6.

FIG. 5 is a perspective view of fishing alarm and lighting apparatus 10 when used with a fishing line and pole. Contact assembly 48 is fixed to housing 12 and consists of fastening lead 50, contact arm 52, spring 54, wing nut 56, contact post 58, and contact pad 60. One side of contact arm 52 is fastened to the housing by fastening lead 50. Contact post 58 is fixed to housing 12 between fastening lead 50 and contact pad 60. Spring 54 is placed on contact post 58. Next, contact post 58 is placed though a hole in the center of contact arm 52 so that contact arm 52 is pressed against spring 40. Wing nut 56 is threadibly engaged to contact post 58 thereby securing contact arm 52.

Fishing line 62 is placed between contact arm 52 and contact pad 60 such that contact arm 52 and contact pad 60 are not touching. Exact placement of contact arm 52 relative to contact pad 60 and fishing line 62 is accomplished by turning wing nut 56. Tightening wing nut 56 compresses spring 40 placing contact arm 52 closer to contact pad 60. Wing nut 56 can be tightened further to hold fishing line 62 between contact arm 52 and contact pad 60. When a fish strikes the hook, fishing line 62 is pulled from in between contact arm 52 and contact pad 60, thereby placing contact arm 52 in contact with contact pad 60. This completes the alarming circuit of fishing alarm and lighting apparatus 10 further described in FIG.6.

Both FIGS. 4 and 5 illustrate the use of preferred detection mechanisms to complete an electrical circuit when a fish strike is detected. One skilled in the art would recognize that other detection methods could be used as an alternative to the electrical contact in the present invention. For example, an apparatus that employs a mechanical arm which moves into a triggering position when the line is tugged could be used. Similarly, an apparatus that senses the motion of the fishing pole or senses the tension of the fishing line would be likely alternatives.

FIG. 6 is a electrical schematic of the fish alarm circuit 66. Fish alarm circuit 66 consists of a battery 68, detection switch 70, indicator light switch 72, speaker switch 74, indicator light 14, speaker 16, and three-way switch 20.

Detection switch 70 represents sensor 42, contact assembly 48, or any other mechanism that is used to detect a fish strike. Detection switch 70 closes when the detection apparatus completes the alarming circuit. This occurs in sensor 42 when the metal ball comes in contact with both wires in electrical lead 40 as described previously. Similarly, detection switch 70 closes when contact arm 52 touches contact pad 60.

Three-way switch 20 controls the function of indicator light 14 and speaker 16, which are represented by indicator light switch 72 and speaker switch 74 respectively. The first position of three-way switch 20 closes indicator light switch 72 enabling only indicator light 14 to signal the detection of a fish strike. The second position of three-way switch 20 does not close indicator light switch 72 or speaker switch 74 thereby completely disabling the alarming capability of fishing alarm and lighting apparatus 10. The third position of three-way switch 20 closes both indicator light switch 72 and speaker switch 74 enabling both indicator light 14 and speaker 16 to signal the detection of a fish strike.

Figure 7:
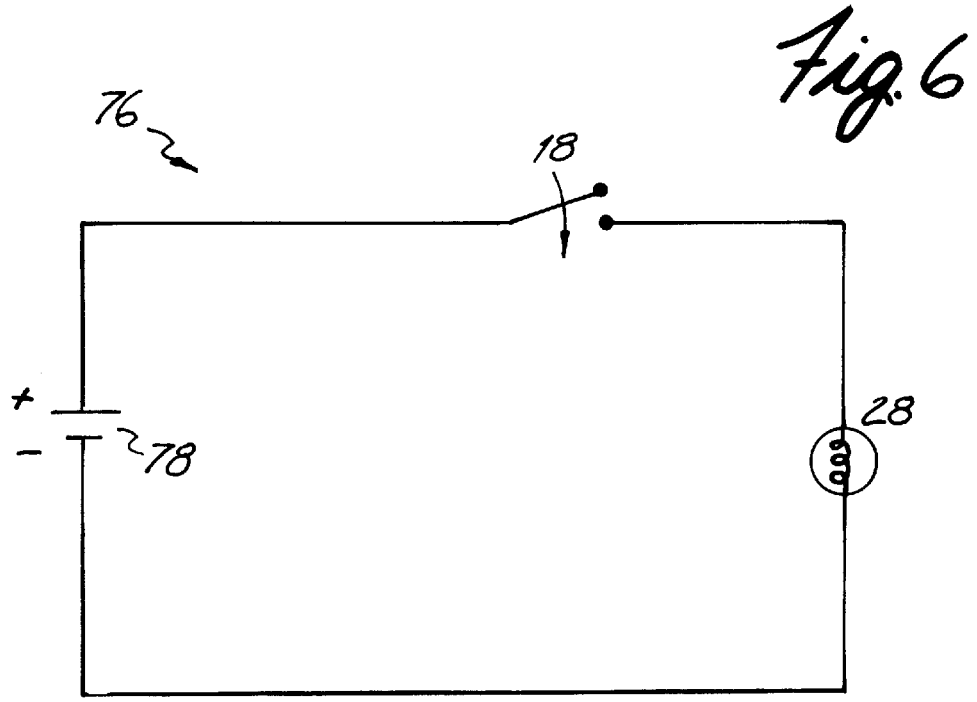
FIG. 7 is an electrical schematic of the utility light circuit.

FIG. 7 is an electrical schematic of utility light circuit 76, which consists of a battery 78, two-way switch 18, and bulb 28. The first position of two-switch 18 completes utility light circuit 76 enabling utility light 24. The second position of two-way switch 18 represents an open circuit disabling utility light 24.

The present invention is a combination of a fishing alarm and a utility light. The apparatus can be used with a fishing pole as well as an ice fishing tip-up. The fish alarm is activated by a switch and can be set to alert fisherman when a fish strikes the hook by a signal light, an audible signal, or by the signal light only. The utility light rotates and pivots with respect to the housing thereby aiding a fisherman when baiting hooks, landing fish, and performing various other tasks.

Although the present invention has been described with reference to preferred embodiments, one skilled in the art will recognize that changes may be made in form and detail without departing from the spirit and scope of the invention.

What is claimed is:

1. A fishing alarm and lighting apparatus comprising:

a portable housing;

an electrical circuit contained within the portable housing;

a power source contained within the portable housing;

a fish strike detector that causes the electrical circuit to be completed when a fish strike is detected;

an alarm, including a signal light, that is triggered when the electrical circuit is completed;

a utility light fixed to the housing, separate from the alarm and capable of simultaneous use with the alarm.

2. The apparatus of claim 1 wherein the fish strike detector comprises an electrical contact that is spring loaded and adjustable for varying pressure.

3. The apparatus of claim 1 wherein the alarm comprises:

the signal light; and an audible speaker.

4. The apparatus of claim 3 further comprising a three-way switch control having a first position to enable only the signal light, a second position to disable the alarm and a third position to enable both the signal light and the audible speaker.

5. The apparatus of claim 1 further comprising a two-way switch control having first position to enable the utility light, and a second position to disable the utility light.

6. The apparatus in claim 1 wherein the utility light is rotatable and pivotable with respect to the housing.

7. The apparatus of claim 1 further comprising a clip connected to the housing for hanging or mounting.

* * * * *